United States Patent [19]

Tatara et al.

[11] Patent Number: 4,660,438

[45] Date of Patent: Apr. 28, 1987

[54] CONTINUOUSLY VARIABLE TRANSMISSION

[75] Inventors: Yuudai Tatara, Susono; Susumu Okawa, Numazu; Hideaki Matsui, Gotenba; Yasunori Nakawaki, Susono, all of Japan

[73] Assignee: Toyota Jidosha Kabushiki Kaisha, Aichi, Japan

[21] Appl. No.: 768,827

[22] Filed: Aug. 23, 1985

Related U.S. Application Data

[63] Continuation-in-part of Ser. No. 563,210, Dec. 19, 1983, abandoned.

[51] Int. Cl.⁴ ............................................. F16H 37/00
[52] U.S. Cl. ............................................ 74/689; 74/745
[58] Field of Search ............ 74/745, 689, 333, 336 R, 74/336 B, 861, 862, 865, 867, 877, 363, 364, 368, 375; 192/48.92, 48.4, 85 AA

[56] References Cited

U.S. PATENT DOCUMENTS

| | | | |
|---|---|---|---|
| 2,156,698 | 5/1939 | Martin | 74/368 |
| 2,241,764 | 5/1941 | Bollinger et al. | 74/745 X |
| 2,246,996 | 6/1941 | Kreis | 192/48.4 X |
| 2,343,312 | 3/1944 | Maurer | 192/48.4 X |
| 2,485,688 | 10/1949 | Banker | 192/48.91 X |
| 2,543,385 | 2/1951 | Tarlton | 74/368 |
| 2,637,217 | 5/1953 | Taylor | 74/865 X |
| 3,251,442 | 5/1966 | Aschauer | 192/48.92 X |
| 3,354,749 | 11/1967 | Sadier | 74/745 |
| 3,596,528 | 8/1971 | Dittrich et al. | 74/865 X |
| 3,600,961 | 8/1971 | Rattunde et al. | 74/867 |
| 3,782,216 | 1/1974 | Sakai | 74/364 |
| 4,224,839 | 9/1980 | von Kaler | 74/745 X |
| 4,311,062 | 1/1982 | Hamada et al. | 74/333 |
| 4,392,394 | 7/1983 | Hofbauer et al. | 74/689 |
| 4,425,989 | 1/1984 | Gotoda | 192/48.92 |
| 4,433,594 | 2/1984 | Smirl | 74/689 |
| 4,458,558 | 7/1984 | Frank | 74/745 X |
| 4,459,872 | 7/1984 | Tibbles | 74/689 X |
| 4,467,669 | 8/1984 | Kawamoto | 74/689 X |
| 4,484,493 | 11/1984 | Yamamuro et al. | 74/689 |
| 4,529,393 | 7/1985 | Makishima | 74/689 |

FOREIGN PATENT DOCUMENTS

| | | | |
|---|---|---|---|
| 1932332 | 1/1971 | Fed. Rep. of Germany | 74/376 |
| 1230353 | 9/1960 | France | 74/336 |
| 56-164229 | 12/1981 | Japan | 192/48.92 |
| 57-161347 | 10/1982 | Japan | 74/865 |
| 58-184349 | 10/1983 | Japan | |
| 58-193965 | 11/1983 | Japan | 474/8 |
| 0736521 | 9/1955 | United Kingdom | 74/745 |
| 0931299 | 7/1963 | United Kingdom | 74/745 |
| 2076484 | 12/1981 | United Kingdom | 74/865 |
| 2144814 | 3/1985 | United Kingdom | |

Primary Examiner—Leslie Braun
Assistant Examiner—Dirk Wright
Attorney, Agent, or Firm—Parkhurst & Oliff

[57] ABSTRACT

This invention relates to a continuously variable transmission which increases the range of potential transmission ratios and thereby decreases the fuel consumption rate, and which is compact in size and thereby increases space in a passenger compartment. The continuously variable transmission has low and high gear trains and a reverse gear train. Each of the low and high gear trains has a pair of meshed gears and a one-way clutch which controls the direction of transmitting the generated torque. The high gear train further has a clutch which engages at a medium or high vehicle speed and disengages at a low vehicle speed. A jaw clutch is slidably mounted on an output shaft and is located in either a first position or a second position. The jaw clutch forms the low gear train when the jaw clutch is in the first position, and the reverse gear train when the jaw clutch is located on the second position.

12 Claims, 3 Drawing Figures

CONTINUOUSLY VARIABLE TRANSMISSION

This is a continuation-in-part application of patent application Ser. No. 563,210 filed on Dec. 19, 1983, now abandoned.

BACKGROUND OF THE INVENTION

The present invention relates to a continuously variable transmission means for transmitting torque from a driving pulley to a driven pulley, both the driving and driven pulleys having contact surfaces whose cross-sections are V-shaped. More particularly, the present invention relates to improvements in the continuously variable transmission means which increases the range of potential transmission ratios and thereby decreases the fuel consumption rate, and which increases the space in a passenger compartment by making the continuously variable transmission compact in size.

A known technique for coupling an engine with driving wheels utilizes a manual transmission which results in the transmission ratios being influenced by a selected position on a gear shift lever. However, an operator cannot always select an optimum position on the gear shift lever for a maximum conservation of fuel. In order to attain the maximum conservation of fuel, a continuously variable transmission has been proposed.

The continuously variable transmission (hereinafter referred to as CVT) has a V-belt extending between a driving pulley and a driven pulley, and the driving and driven pulleys are connected respectively to input and output shafts of the CVT. Further, the continuously variable transmission includes a predetermined number of metallic hoops, and V-shaped block members which are slidably mounted on the metallic hoops. The V-shaped block members are linked together and extend around the total circumference of the hoops. The driving force from the driving pulley is then transmitted to the driven pulley by a movement of the V-shaped block members. Accordingly, the transmission ratio of the CVT can be changed by varying the size of a V-shaped opening of at least one of the driving and driven pulleys.

However, the transmission ratio of a conventional CVT cannot be of a wide range because of the strength and durability of the V-belt. Accordingly, the conventional CVT cannot achieve a maximum conservation of fuel.

SUMMARY OF THE INVENTION

The present invention was developed in view of the foregoing background and to overcome the foregoing drawbacks. It is accordingly an object of this invention to provide a continuously variable transmission means which increases the range of potential transmission ratios and thereby decreases the fuel consumption rate, and which is compact in size.

To attain the above objects, a continuously variable transmission means has a low gear train, a high gear train and a reverse gear train. The low gear train, the high gear train and the reverse gear train are connected to a driven pulley. Each of the lower and higher gear trains has meshed gears and a one-way clutch which controls the direction of transmitting the generated torque. The meshed gears are mounted on a first output shaft which is parallel to a second output shaft. The high gear train also has a clutch means, which engages at a medium or high vehicle speed and disengages at a low vehicle speed.

A jaw clutch is mounted slidably on the second output shaft. The jaw clutch is part of the low gear train when the jaw clutch is in a first position and the jaw clutch is part of the reverse gear train when the jaw clutch is in a second position.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENT

The present invention will be described in detail with reference to the accompanying drawings which illustrate a preferred embodiment according to the present invention.

Figure 1:
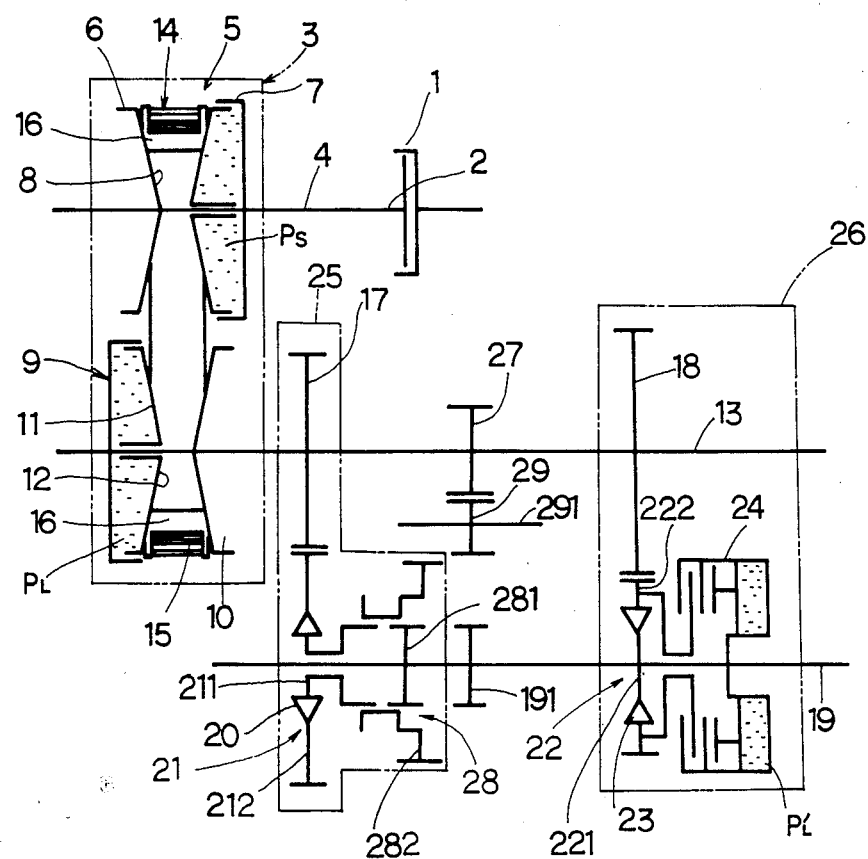
FIG. 1 is a schematic view of an embodiment of the present invention, wherein a jaw clutch is in a first position and is part of a low gear train.

FIG. 1 shows a schematic view of an embodiment of the present invention. A shaft 2 is connected to an engine (not shown in drawings) through the engagement of a clutch 1. The shaft 2 is also connected to an input shaft 4 of a continuously variable transmission (hereinafter referred to as CVT) 3. The CVT 3 has a driving pulley 5, a driven pulley 9 and a V-belt 14, which spans between the driving and driven pulleys 5 and 9.

The driving pulley 5 has a non-movable member 6, fixed to and rotatable with the input shaft 4 and a movable member 7, which is axially movable on and rotatable with the input shaft 4. The movable member 7 can be axially displaced toward and away from the non-movable member 6 by the pressure of a hydraulic cylinder $P_s$ acting upon it. As a result of the movement of the movable member 7, the width of the V-shaped opening defined between the members 6 and 7 can be adjusted, thereby changing the effective diameter of the driving pulley 5.

Similarly, the driven pulley 9 has a non-movable member 10 fixed to and rotatable with the first output shaft 13, and a movable member 11, which is axially movable on and rotatable with the first output shaft 13. The movable member 11 can be axially displaced toward and away from the non-movable member 10 by the pressure of a hydraulic cylinder $P_L$ acting upon it. Consequently, the width of the V-shaped opening 12 defined between the members 10 and 11 can be adjusted, thereby changing the effective diameter of the driven pulley 9.

A V-belt 14 extends between the V-shaped opening 8 in the driving pulley 5 and the V-shaped opening 12 in the driven pulley 9. The V-belt 14 has a plurality of metallic carriers 15 superimposed on each other and a plurality of V-shaped metallic blocks 16 mounted on the carriers 15.

A plurality of gear trains are mounted on the first output shaft 13 and on a second output shaft 19 which is provided in a parallel relationship to the first output shaft 13. A first gear 17 and a second gear 18 are mounted on the first output shaft 13. The second gear 18 has a larger outer diameter than the first gear 17. A third gear 21, which is in a constant meshing relationship with the first gear 17, is mounted on the second output shaft 19. A first one-way clutch 20 is provided between the third gear 21 and a second outer portion 212 of the third gear 21. When the first one-way clutch 20 is not engaged, the third gear 21 freely rotates around the second output shaft 19 (i.e., there is no torque transfer). The first one-way clutch 20 allows for a torque transfer from the first output shaft 13 to the second output shaft 19 through the first gear 17 and the third gear 21. The first one-way clutch 20 is only engaged when the third gear 21 is driven by the first gear 17.

A jaw clutch 28 is mounted on the second output shaft 19. The jaw clutch 28 is made of a first secured portion 281 and a second slidable portion 282. The second slidable portion 282 is in a continuous meshing relationship with the first secured portion 281. The first secured portion 281 is fixed to the second output shaft 19 and continually rotates with the second output shaft 19. The second slidable portion 282 is movable between a first position (shown in FIG. 1) in which it is in a meshing relationship with the third gear 21 and the first secured portion 281 and a second position (shown in FIG. 2) in which it is in a meshing relationship with the first secured portion 281 and the idler gear 29. The idler gear 29, which is fixed to an intermediate shaft 291 positioned between, and parallel to, the first output shaft 13 and the second output shaft 19, continually meshes with a reverse gear 27. The reverse gear 27 is fixed to the first output shaft 13 between the first gear 17 and the second gear 18.

The third gear 21 has a larger outer diameter than the outer diameter of the first gear 17. Accordingly, when the jaw clutch 28 is in the first position, the first gear 17, the third gear 21 and the jaw clutch 28 comprise a low gear train 25. When the jaw clutch 28 selects its first position. When a torque is transmitted through the low gear train 25, the rotation of the driven pulley 9 is transmitted to the second output shaft 19, and the number of rotations of the second shaft 19 is smaller than the number of rotations of the driven pulley 9.

A fourth gear 22 is also mounted on the second output shaft 19 with the third gear 21. The fourth gear 22 is in a constant meshing relationship with the second gear 18. A second one-way clutch 23 is provided between a second outer portion 222 of the fourth gear 22 and a second base portion 221 of the fourth gear 22. The second one-way clutch 23 allows for a torque transfer from the second output shaft 19 to the first output shaft 13 through the fourth gear 22 and the second gear 18, but this torque transfer occurs only when the second gear 18 is driven by the fourth gear 22.

A hydraulic clutch 24 is provided between the fourth gear 22 and the second output shaft 19. The clutch 24 fixes the fourth gear 22 to the second output shaft 19 when a hydraulic cylinder $P_L'$ activates the clutch 24. When neither the second one-way clutch 23 nor the hydraulic clutch 24 are engaged (i.e., when they do not allow a torque transfer) the fourth gear 22 freely rotates around second output shaft 19. The second gear 18 has a larger outer diameter than the outer diameter of the fourth gear 22. Accordingly, the second gear 18, the fourth gear 22 and the hydraulic clutch 24 comprise a high gear train 26. When torque is transmitted through the high gear train 26, the second output shaft 19 rotates at a higher speed than the first output shaft 13.

When the jaw clutch 28 is in the second position, the direction of rotation of the first secured portion 281 of the jaw clutch 28 is the reverse of the direction of rotation of the first gear 17, accordingly, the reverse gear 27, the idler gear 29 and the jaw clutch 28 comprise a reverse gear train 271. Torque is transmitted through the reverse gear train 271 from the driven pulley 9 to the second output shaft 19.

Further, a seventh gear 191 is mounted securely on the second output shaft 19 and is located between the first secured portion 281 of the jaw clutch 28 and the fourth gear 22, and the torque is transmitted through the seventh gear 191 to a differential gear (not shown in drawings).

The reverse gear train 271, therefore, is located between the low gear train 25 and the high gear train 26, and the jaw clutch 28 selectively can be part of either the reverse gear train 271 or the low gear train 25 so that the gear trains can be assembled in compact size.

Figure 3:
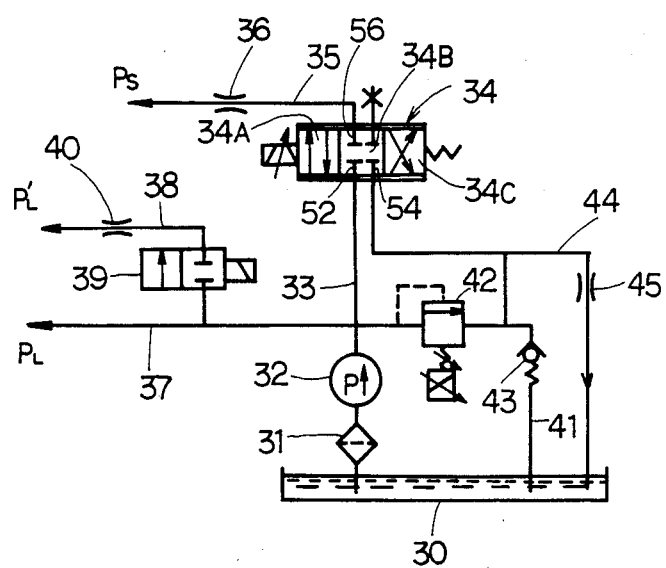
FIG. 3 is a hydraulic circuit employed in the embodiment shown in FIG. 1.

FIG. 3 shows a hydraulic circuit for operating the CVT 3 and the hydraulic clutch 24. A hydraulic fluid pump 32, driven by a motor, supplies the fluid from a reservoir 30 into a passage 33, after having passed through a strainer 31. A regulator valve 42 controls the pressure of the fluid in the passages 33 and 37, thereby generating a line pressure in the passages 33 and 37. The line pressure is supplied through the passage 37 and into the cylinder $P_L$ of the driven pulley 9, and through the passage 33 and into a flow control valve 34. The line pressure may also be supplied into a selector valve 39 and into a cylinder $P_L'$ of the hydraulic clutch 24.

The flow control valve 34 is a three port connection valve, and includes an inlet port 52 which communicates through the passage 33 with the regulator valve 42, a drain port 54 which communicates with a drain passage 44, and an outlet port 56 which communicates with the cylinder $P_S$ of the driving pulley 5. When the flow control valve 34 is in a first position 34A, the inlet port 52 communicates with the outlet port 56. In this condition, a line pressure is supplied to the cylinder $P_S$ of the driving pulley 5 by a passage 35 and an orifice 36. When the flow control valve 34 is in a second position 34B, there is no communication between the three ports 52, 54 and 56, as shown in FIG. 3. Finally, when the flow control valve 34 is in a third position 34C, the outlet port 56 communicates with the drain port 54. An orifice 45 is provided on the drain passage 44. A check valve 43 is provided on the drain passage 41 which connects the regulator valve 42 with the hydraulic fluid reservoir 30. The check valve 43 allows for a flow of hydraulic fluid only from the regulator valve 42 and into the hydraulic fluid reservoir 30.

The selector valve 39 is provided between the hydraulic clutch 24 and the passage 37. When a solenoid provided in the selector valve 39 is actuated, the passage 37 communicates with the passage 38 through the selector valve 39. The solenoid of the selector valve 39 is actuated when the vehicle attains a medium or high speed. An orifice 40 is also provided on the passage 38.

Once the engine is started and the system is placed in operation, the driving torque is transmitted through the clutch 1 to the input shaft 4 of the CVT 3. The flow control valve 34 controls the amount of the oil supplied to the cylinder $P_S$ of the driving pulley 5, in accordance with the displacement of an accelerator pedal (not shown in drawings). The rotation of the input shaft 4 is transmitted to the first output shaft 13 of the CVT 3.

When the vehicle begins to move or continues to move at a slow speed, a solenoid provided in the selector valve 39, is not actuated. Consequently, the passage 38 does not communicate with the line pressure passage 37, as shown in FIG. 3. In this condition, the hydraulic cylinder $P_L'$ is not supplied with the line pressure fluid. Accordingly, the clutch 24 is not actuated and the fourth gear 22 is disengaged from the second output shaft 19. Hence, there is no transfer of torque by the second one-way clutch 23 from the second gear 18 through the fourth gear 22 to the second output shaft 19. However, when the first gear 17 meshes with the third gear 21, and the second slidable portion 282 of the jaw clutch 28 meshes with both of the first base portion 211 of the third gear 21, torque from the first output shaft 13 is transmitted through the first one-way clutch 20 and the jaw clutch 28 to the second output shaft 19, resulting in a low speed range.

When the vehicle is running at a medium or a high speed, the solenoid provided in the selector valve 39 is actuated resulting in the passage 38 communicating with the passage 37. The line pressure in the passage 37 is supplied to the cylinder $P_L'$ thereby actuating the hydraulic clutch 24. This actuation results in the fourth gear 22 becoming fixed to the second output shaft 19. When the fourth gear 22 is fixed to the second output shaft 19, the torque of the first output shaft 13 is transmitted through the second gear 18, the fourth gear 22 and the hydraulic clutch 24 to the second output shaft 19. Since the second gear 18, the fourth gear 22, and the hydraulic clutch 24 comprise the high speed gear train 26, the second output shaft 19 rotates at a higher speed than the first output shaft 13. When the second output shaft 19 rotates at a higher speed than the first output shaft 13, the first one-way clutch 20 is disengaged, and no torque is transmitted from the first gear 17 through the third gear 21, or to the second output shaft 19.

When vehicle speed is decreased from a medium or a high speed to a low speed, the solenoid of the selector valve 39 is deactuated. Hence, there is no pressure supplied to the hydraulic clutch 24, which results in a disengagement between the fourth gear 22 and the second output shaft 19 through the hydraulic clutch 24. The second output shaft 19 then rotates the first output shaft 13 through the second one-way clutch 23. In this state, torque is transmitted through the second one-way clutch 23 which is disposed on the fourth gear 22, the fourth gear 22, and the second gear 18. This rotation causes the effect of an engine brake upon the second output shaft 19, resulting in the vehicle gradually stopping.

After the vehicle speed has decreased to a slow speed, a displacement of the acceleration pedal may cause the revolution speed of the first output shaft 13 to exceed the revolution speed of the second output shaft 19. In this condition, torque is transmitted from the first output shaft 13 to the second output shaft 19 through the low gear train 25. Concurrently, the second one-way clutch 23 disengages the second outer portion 222 of the fourth gear 22 from the second base portion 221 of the fourth gear 22 because the second gear 18 forces the rotation of the fourth gear 22. Hence, the vehicle runs at a low speed.

Figure 2:
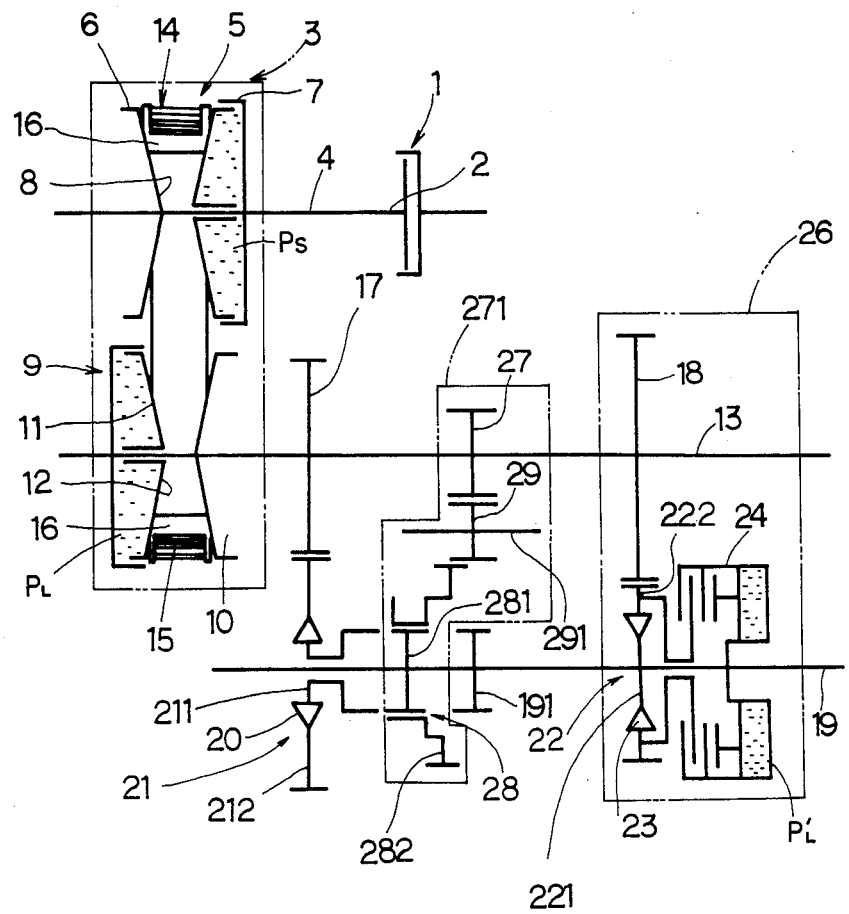
FIG. 2 is a schematic view of the embodiment, wherein the jaw clutch is in a second position and is part of a reverse gear train.

When the jaw clutch 28 is in the second position, as shown in FIG. 2, the second slidable portion 282 of the jaw clutch 28 does not mesh the first base portion 211 of the third gear 21. Therefore, torque is not transmitted from the first output shaft 13 to the second output shaft 19 through the low gear train 25. However, the second slidable portion 282 of the jaw clutch 28 does mesh with the idler gear 29. The second output shaft 19 is rotated through the reverse gear train 271, thereby causing reverse rotation of the second output shaft 19.

As described herein, the present invention overcomes the shortcomings of the prior art by providing a continuously variable transmission means which has low and high gear trains and a reverse gear train.

While the present invention has been described in its preferred embodiment, it is to be understood that the invention is not limited thereto, and may be otherwise embodied within the scope of the following claims.

What is claimed is:

1. A continuously variable transmission means for motor vehicles including a driving pulley with a fixed member and a movable member, said movable member being actuated by a hydraulic cylinder to form a V-shaped opening therebetween, a driven pulley with another fixed member and another movable member, said another movable member being actuated by another hydraulic cylinder to form another V-shaped opening therebetween, and a flexible endless member spanning the driving and driven pulleys, said continuously variable transmission means comprising:

a first output shaft connected with the driven pulley;
a first gear secured on the first output shaft;
a second gear secured on the first output shaft;
a reverse gear secured on the first output shaft;
a second output shaft provided in a parallel relationship to the first output shaft;
a third gear mounted on the second output shaft, the third gear being in a constant meshing relationship with the first gear;
a jaw clutch mounted slidably between a first position and a second position on the second output shaft, the jaw clutch being in a meshing relationship with the third gear at said first position, the jaw clutch, the first gear and the third gear comprising a low gear train, the jaw clutch being in a meshing relationship with the reverse gear at said second position; the jaw clutch and said reverse gear comprising a reverse gear train;
a first one-way clutch provided between the third gear and the second output shaft, the first one-way clutch transmitting a torque from the first output shaft to the second output shaft through the jaw clutch when said first output shaft is driven faster than said second output shaft and the jaw clutch is in said first position;
a fourth gear mounted on said second output shaft, the fourth gear being in a constant meshing relationship with the second gear, the fourth gear and the second gear comprising a high gear train;
a hydraulic clutch means for engaging the fourth gear with said second output shaft when the motor vehicle is driven at a medium or a high velocity, said hydraulic clutch means disengaging said fourth gear from said second output shaft when the motor vehicle is driven at a low velocity; and
a second one-way clutch provided between the fourth gear and the second output shaft, the second one-way clutch transmitting a torque from the second output shaft to the first output shaft when said hydraulic clutch means disengages said fourth gear from the second output shaft and the second output shaft is rotated faster than the first output shaft.

2. The continuously variable transmission means of claim 1, further comprising;
   a selector means for supplying hydraulic fluid to the hydraulic clutch means when the vehicle is driven at a medium or a high velocity, and draining hydraulic fluid from the hydraulic clutch means when the vehicle is driven at a low velocity.

3. The continuously variable transmission means of claim 2, further comprising:
   a regulator means for generating a line pressure, the line pressure being supplied to the hydraulic cylinders of the driving and driven pulleys and to the hydraulic clutch means.

4. The continuously variable transmission means of claim 3, further comprising:
   flow control means for controlling the amount of hydraulic fluid supplied to the hydraulic cylinder of the driving pulley, the flow control means being provided between the hydraulic cylinder of the driving pulley and the regulator means.

5. The continuously variable transmission means of claim 1, further comprising:
   an intermediate shaft located between the first output shaft and the second output shaft and parallel to the first output shaft and the second output shaft; and
   an idler gear secured on said intermediate shaft and meshing with the reverse gear, said idler gear being included in said reverse gear train.

6. The continuously variable transmission means of claim 5, wherein said jaw clutch comprises a sliding gear and a secured gear, the secured gear being fixed to said second output shaft, the movable gear mounted slidably on the second output shaft, the movable gear being in the meshing relationship with the third gear and the secured gear at the first position, said sliding gear being in said meshing relationship with the idler gear and the secured gear in said second position.

7. The transmission means of claim 6, wherein the reverse gear is located between the first gear and the second gear.

8. The transmission means of claim 7, wherein the jaw clutch is located between the third gear and the fourth gear.

9. The transmission means of claim 8, further comprising an output gear mounted on the second output shaft and located between the jaw clutch and the fourth gear.

10. The transmission means of claim 6, wherein the third gear includes a first base portion mounted on the second output shaft and a first outer portion, said first base portion being in said meshing relationship with said sliding gear of the jaw clutch when the sliding gear of the jaw clutch is in said first position.

11. The transmission means of claim 10, wherein said first one-way clutch is located between said first outer portion of said third gear and said first base portion of said third gear.

12. The transmission means of claim 6, wherein the fourth gear includes a second base portion and a second outer portion, the second base portion mounted securely on the second output shaft, wherein said second one-way clutch is located between said second outer portion of said fourth gear and the second base portion of said fourth gear.

* * * * *